Sept. 29, 1942.   A. NÁDAI ET AL   2,297,236
BELT SHIFTER
Filed Feb. 11, 1939

Inventors.
ALEXANDER NADAI
AND
JOSEF STERN
By Haseltine, Lake & Co.
Attorneys.

Patented Sept. 29, 1942

2,297,236

UNITED STATES PATENT OFFICE 2,297,236

BELT SHIFTER

Alexander Nádai and Josef Stern, Budapest, Hungary; vested in the Alien Property Custodian Application February 11, 1939, Serial No. 255,825
In Hungary November 22, 1938

5 Claims. (Cl. 74—242)

It is a common defect of the known types of devices for shifting a driving belt from one pulley to another that they cause the edges of the belts, particularly in the case of rubber belts, to suffer substantial damage. This is due to the fact that when shifting a belt from one pulley to another, it is on the edge of the belt that the force required for shifting the belt is exerted and therefore the friction set up at the said edge, particularly when the belt is running at a high speed, will cause the belt to become rapidly worn, ragged and reduced in width. Belt-shifting devices have indeed been constructed in which rotatable vertical cylinders were drawn on the vertical bars of the shifting device, in order to reduce friction during contact with the belt, but these devices also caused the edges of the belt to become ragged, because, after all, in the case of these devices also, the force was being applied on the narrow edge of the belt. In the case of rubber belts it has been attempted to fit the edges of the belt with borders of resistant materials, as e. g. of hard leather or metal, but such belts also became unserviceable very soon.

Devices are also commonly known which effect the shifting of the belt by means of sliding and guiding; they have, however, the disadvantage that the shifting of the belt proceeds very slowly and uncertainly.

The invention eliminates these defects, because it enables the force exerted during the process of shifting to be applied not on the edge of the belt, but on its back face. The substance of the invention consists in a belt-shifting device comprising members preferably journalled rotatably, displaced by means of the rigging of the belt-shifting device, which members are, during the process of belt-shifting, bending out that face of the belt which is in contact with the pulley, and on which members the said face of the belt becomes supported, whilst at the same time the force required for shifting the belt is exercised by the member mentioned on the said face of the belt.

In a particular embodiment of the invention, the abovementioned members arranged in a rotatable manner in the rigging of the belt-shifting device are represented by rotational bodies of such a kind, the diameter of which diminishes towards the central part of the belt, e. g. preferably cones, whilst at the same time the parts of smallest diameter or vertices of the said rotational bodies, are arranged close to that face of the belt which is in contact with the pulley, in such a manner that during belt-shifting this face of the belt becomes supported on, or becomes pushed on the parts of greater diameter of the said rotational bodies. Thus the lateral edge of the belt will not be subject to the action of any force whatever, and therefore it will neither become ragged, nor become prematurely destroyed. If the said rotational bodies are made of conical shape, their arrangement will be such that the vertex of the cone will be pointing towards the central part of the belt, i. e. towards the longitudinal plane of symmetry of the belt. Of course the shape of the boundary curve of the rotational body may also differ from a straight line i. e. the rotational body need not be under all circumstances of conical shape but may also be a rotational body of some other kind; particularly it may be a rotational body the boundary curve whereof is such that its individual points are, when proceeding along the curve towards the central part of the belt, approaching the axis of rotation at first under a steeper and later on at a less steep angle i. e. the diameters of the rotational body are, when approaching the central part of the belt, diminishing at first more rapidly and later on less rapidly. The rotational body, of course, will present the shape resulting from the rotation of the said curve around the axis of rotation. If a belt shifting device fitted with such a rotational body is rotated in one direction, the places of smallest diameter of the rotational body will get below the back face of the belt, whilst during the course of the displacement the edge of the back face of the belt running-up on the pulley will become bent up, and will run on the rotational body. During the further displacement of the rotational body, however, the horizontal component of the force exerted by the conical part on the belt will displace the belt and eventually push it from one pulley to the other desired pulley. The belt in movement can be displaced in the horizontal direction very easily and therefore only a part of small width of the same will run-up on the cone of the belt shifter, because in case of a further displacement the belt itself also already becomes displaced.

The invention is further explained in greater detail with reference to the figures of the accompanying drawing, representing various embodiments of the same shown by way of example.

Figure 1:
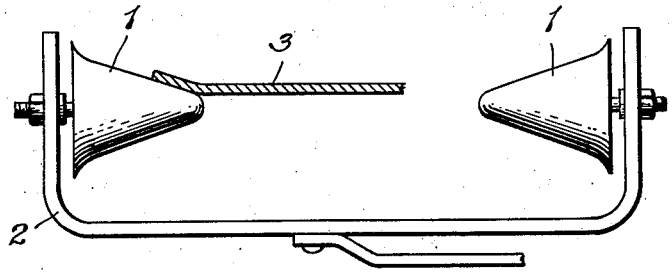
Fig. 1 is a side elevation of the belt shifter with conical bodies of rotation, with the belt to be shifted shown in cross-section, during the operation of shifting.
Figure 2:
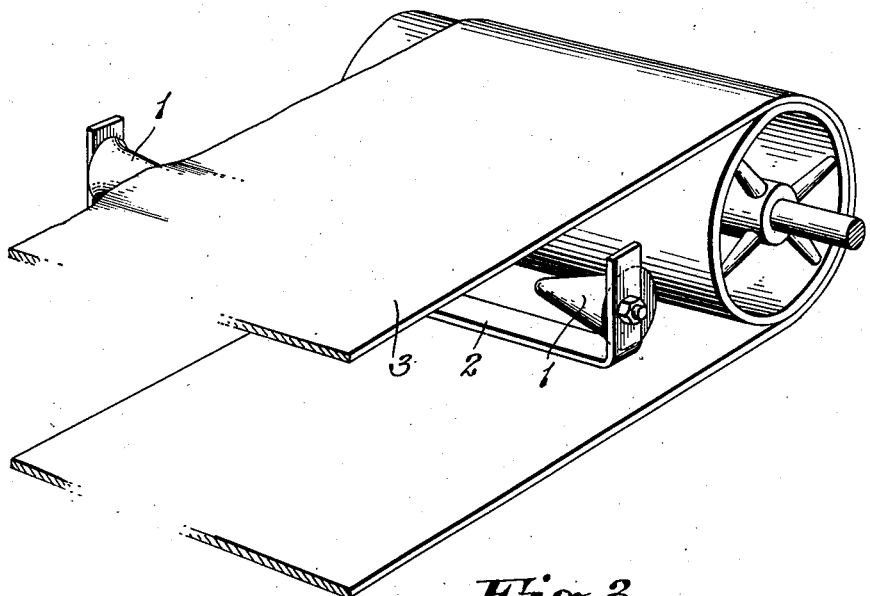
Fig. 2 is a view in perspective of the belt shifter and of the belt running-up on the pulley during the process of belt shifting.
Figure 3:
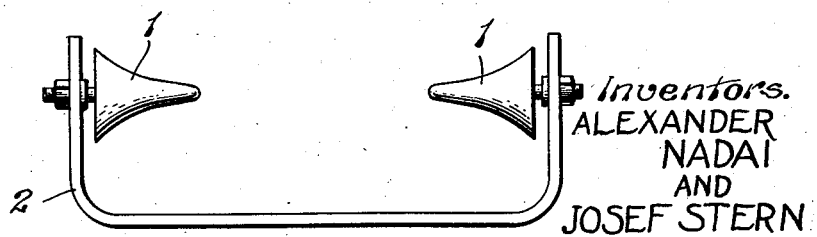
Fig. 3 is side elevation of the belt shifter comprising rotational bodies of curved outline.

If it is desired to displace the belt, the beltshifter is displaced in the direction of the desired shifting and in the course of this movement the parts of smallest diameter of the rotatably journalled body 1, which is preferably of a conical shape, will get behind the back face of the belt, the belt will accordingly by its bent-up edge partly run-up on the rotational body, during which process the rotational body rotatably journalled in the rigging 2, will by means of the horizontal component of the force exerted on the bent-up part of the belt 3 displace the belt in the desired sense. The rotational body is adjusted in such a manner that in the position of rest of the belt the latter will only just touch the body pushed below it. If the belt is set into motion it will become slightly raised, the parts of smallest diameter can be easily pushed below it, whereas at the increasing diameters the back face of the belt will already become supported on the rotational body and the belt can be displaced with the aid of the latter. Naturally the boundary curve of the rotational body can be made of any desired steepness.

What we claim as new and desire to secure by Letters Patent of the United States is:

1. In a belt-shifting device of the kind in which a flat belt passes between a pair of shifting members adapted to be moved rectilinearly in a direction substantially at right angles to the travel of the belt, the feature of having said shifting members aligned and of substantially wedge shaped profile, with the smaller ends mutually directed toward each other so that each shifting member engages obliquely with lower surface of the belt in order to shift the latter sideways while allowing the edges of the belt to remain free.

2. In a belt-shifting device of the kind in which a flat belt passes between a pair of shifting members adapted to be moved rectilinearly in a direction substantially at right angles to the travel of the belt, the features which consist in having a flat endless belt of uniform width and the shifting members of substantially conical shape and rotatable about their geometrical axes, with each shifting member engaging obliquely with a lower surface of the belt in order to shift the latter sideways while allowing the edges of the belt to remain free.

3. A belt shifting device including a flat endless belt and a pair of shifting members between which said flat belt is adapted to pass and which are mounted for simultaneous movement in a direction substantially at right angles to the direction of travel of the belt, said shifting members consisting of two conical bodies rotatably journaled to rotate on their geometric axes and having their vertices directed toward the belt so that their diameters decrease toward the center of said belt, whereby when said members are moved in either direction one of them engages the inner face of the belt while leaving the edge of the latter free in order to urge said belt in the direction of motion of said members.

4. In a belt-shifting device of the kind in which a flat belt passes between a pair of shifting members adapted to be moved rectilinearly in a direction substantially at right angles to the travel of the belt, the features which consist in having a flat endless belt of uniform width and the shifting members provided with a shaft so as to be rotatable about the axis thereof and being of circular cross section and arranged axially in a direction substantially at right angles to the direction of travel of the belt, said shaft being substantially parallel to the plane of the belt, the transverse diameter of said shifting members varying from maximum diameter exteriorly of the edges of the belt and decreasing to minimum diameter toward each other and the center of the belt, and each shifting member being axially of curved profile between the base and apex thereof and engaging obliquely with the lower surface of the belt in order to shift the latter sideways while allowing the edges of said belt to remain free.

5. In a belt-shifting device of the kind in which a flat belt passes between a pair of shifting members adapted to be moved rectilinearly in a direction substantially at right angles to the travel of the belt, the features which consists in having a flat endless belt of uniform width and the shifting members provided with a shaft so as to be rotatable about the axis thereof and being of circular cross section and arranged axially in a direction substantially at right angles to the direction of travel of the belt, said shaft being substantially parallel to the plane of the belt, each shifting member being axially of curved concave profile between the base and apex thereof, both shifting members being disposed in line with their transverse diameters varying from maximum diameter exteriorly of the edges of the belt and decreasing to minimum diameter toward each other and toward the center of the belt, and each shifting member engaging obliquely with the lower surface of the belt in order to shift the latter sideways while allowing the edges of said belt to remain free.

ALEXANDER NÁDAI.
JOSEF STERN.